US012624957B2

(12) United States Patent
Park et al.

(10) Patent No.: US 12,624,957 B2
(45) Date of Patent: May 12, 2026

(54) METHOD AND APPARATUS WITH PARKING PATH DETERMINATION

(71) Applicant: Samsung Electronics Co., Ltd., Suwon-si (KR)

(72) Inventors: Daeul Park, Suwon-si (KR); Seho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 18/119,577

(22) Filed: Mar. 9, 2023

(65) Prior Publication Data

US 2024/0118102 A1     Apr. 11, 2024

(30) Foreign Application Priority Data

Oct. 6, 2022     (KR) ........................ 10-2022-0128066

(51) Int. Cl.
*G01C 21/36*          (2006.01)
*G01C 21/34*          (2006.01)
(52) U.S. Cl.
CPC ..... *G01C 21/3614* (2013.01); *G01C 21/3476* (2013.01)
(58) Field of Classification Search
None
See application file for complete search history.

(56) References Cited

U.S. PATENT DOCUMENTS

| | | | |
|---|---|---|---|
| 11,366,477 B2 | 6/2022 | Hasegawa et al. | |
| 2010/0211267 A1* | 8/2010 | Shimazaki | G08G 1/168 |
| | | | 340/932.2 |
| 2018/0345955 A1* | 12/2018 | Kim | B62D 15/0285 |
| 2019/0004524 A1* | 1/2019 | Wang | B60W 60/001 |
| 2019/0027042 A1 | 1/2019 | Fujishima et al. | |
| 2021/0291679 A1* | 9/2021 | Yu | B62D 15/0285 |
| 2022/0073101 A1* | 3/2022 | Wang | B62D 15/0285 |
| 2023/0063133 A1* | 3/2023 | Cho | B60W 30/06 |
| 2023/0091505 A1* | 3/2023 | Fujita | B60R 99/00 |
| | | | 701/23 |

FOREIGN PATENT DOCUMENTS

| | | |
|---|---|---|
| CN | 105573323 A | 5/2016 |
| CN | 112356830 A | 2/2021 |

(Continued)

OTHER PUBLICATIONS

European Office Action issued on Nov. 27, 2024, in counterpart European Patent Application No. 23 189 691.1 (9 pages).

(Continued)

*Primary Examiner* — Hongye Liang
(74) *Attorney, Agent, or Firm* — NSIP Law

(57) ABSTRACT

A device for determining a parking path based on a user input including a processor, and a memory storing a plurality of instructions and the processor is configured to execute the plurality of instructions to configure the processor to be configured to recognize a space around a vehicle to determine one or more candidate parking spaces and determine a final parking path from a current location to a target parking space by using a user selected input initial parking path, of the one or more candidate parking paths, as an initial value for a search algorithm for the final parking path.

16 Claims, 9 Drawing Sheets

(56)  References Cited

FOREIGN PATENT DOCUMENTS

| EP | 4 019 350 | A1 | 6/2022 |
| JP | 2015-3615 | A | 1/2015 |
| JP | 2022-526191 | A | 5/2022 |
| KR | 10-2020-0046160 | A | 5/2020 |
| KR | 10-2265621 | B1 | 6/2021 |
| KR | 10-2358404 | B1 | 2/2022 |

OTHER PUBLICATIONS

Extended European search report issued on Feb. 26, 2024, in counterpart European Patent Application No. 23189691.1 (10 pages). Extended European Search Report issued on Mar. 28, 2025, in counterpart European Patent Application No. 23189691.1. (7pages in English).

* cited by examiner

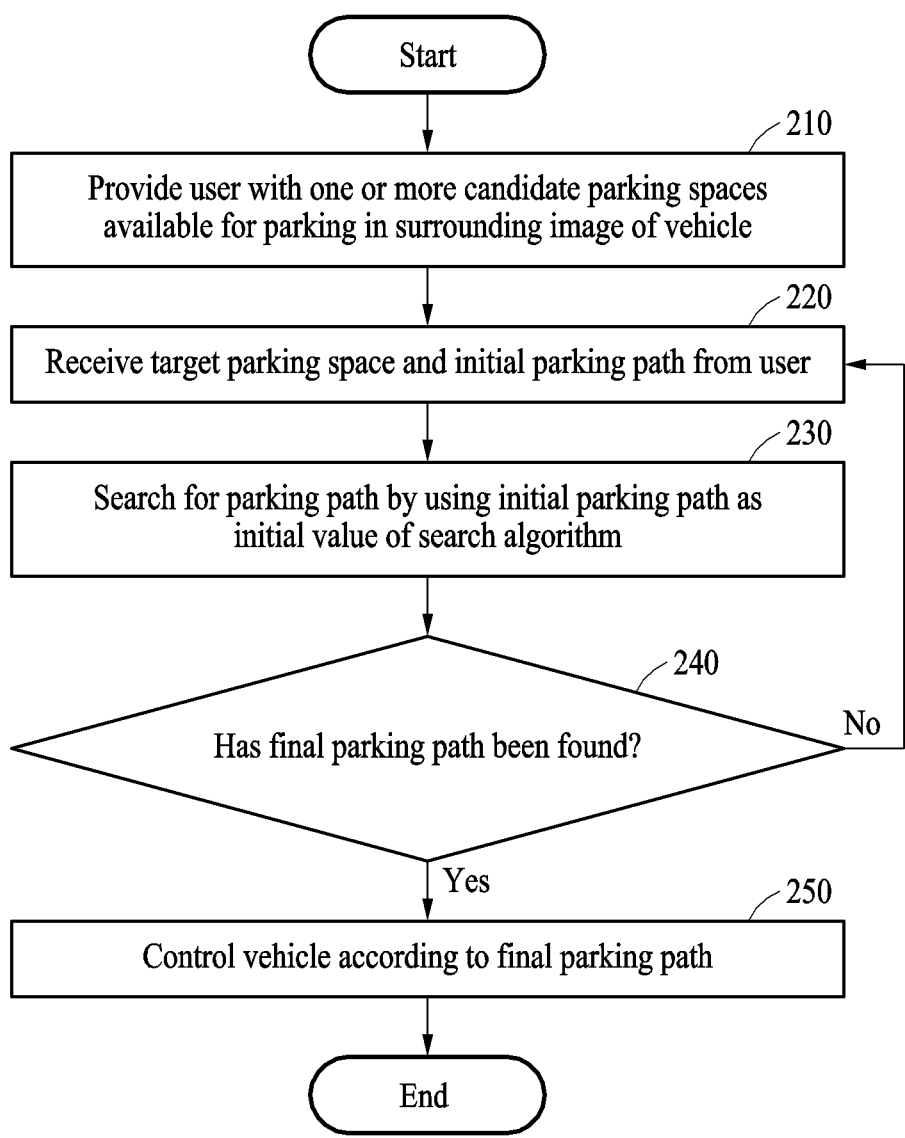

Start

210

Provide user with one or more candidate parking spaces available for parking in surrounding image of vehicle

220

Receive target parking space and initial parking path from user

230

Search for parking path by using initial parking path as initial value of search algorithm

240

Has final parking path been found?    No

Yes

250

Control vehicle according to final parking path

End

FIG. 2

METHOD AND APPARATUS WITH PARKING PATH DETERMINATION

CROSS-REFERENCE TO RELATED APPLICATIONS

This application claims the benefit under 35 USC § 119(a) of Korean Patent Application No. 10-2022-0128066, filed on Oct. 6, 2022, at the Korean Intellectual Property Office, the entire disclosure of which is incorporated herein by reference for all purposes.

BACKGROUND

1. Field

The following description relates to a method and apparatus for parking path determination.

2. Description of Related Art

Typically, smart parking assist systems (SPAS) may recognize a parking space using an ultrasonic sensor and a camera mounted on a vehicle. The SPAS can help a driver park without the driver having to the steer the vehicle.

SUMMARY

This Summary is provided to introduce a selection of concepts in a simplified form that are further described below in the Detailed Description. This Summary is not intended to identify key features or essential features of the claimed subject matter and is not intended to be used as an aid in determining the scope of the claimed subject matter.

In one general aspect, here is provided a device including a processor configured to execute a plurality of instructions and a memory storing the plurality of instructions, wherein execution of the plurality of instructions configures the processor to be configured to recognize a space around a vehicle to determine one or more candidate parking spaces and determine a final parking path from a current location to a target parking space by using a user selected, included in one or more candidate parking paths, initial parking path as an initial value for a search algorithm for the final parking path.

The processor may be configured to receive a first user input to indicate the initial parking path from a current location of the vehicle to the target parking space from among the one or more candidate parking spaces and receive a second user input to indicate a movement of the vehicle from the current location to the target parking space as an initial parking path.

The processor may be configured to display the current location of the vehicle on a display and receive a user input, the user input including reception of a first user touch input through a touch control indicating a selection of the target parking space from among the one or more candidate parking spaces, and display the target parking space on the display and reception of a second user touch input through the touch control connecting the current location and the target parking space on the display to set the initial parking path.

The device may include the displays, wherein the touch control is received through the display.

The processor may be configured to determine one or a combination of two or more of a time to start controlling the vehicle according to the final parking path, a moving speed of the vehicle, and a parking type of the vehicle, based on a voice command.

The parking type of the vehicle may be a selection of a direction in which the vehicle is to face when parked in the target parking space.

The processor may be configured to inactive a portion of a search area to which the search algorithm is applied to provide a reduced search area and determine the final parking path in the reduced search area using the initial parking path.

The processor may be configured to generate a probability distribution based on the initial parking path within a search area and extend a tree from a starting point corresponding to the current location to an ending point corresponding to the target parking space in the search area to generate the final parking path using the probability distribution as a sample.

The processor may be configured to divide a search area into a plurality of grids, deactivate one or more grids of the plurality of grids that are separated from the initial parking path by a distance greater than or equal to a predetermined distance, and determine the final parking path based on an optimal path among remaining grids of the plurality of grids connecting the current location to the target parking space.

The processor may be configured to request a second initial parking in response to a search for the final parking path not being completed within a predetermined time.

The processor may be configured to generate surrounding image of the vehicle using images acquired through one or more cameras, determine one or more candidate parking spaces in which the vehicle may be parked, in the surrounding image, and display the one or more candidate parking spaces in the surrounding image.

The one or more cameras may be disposed in the vehicle, in a facility where the one or more candidate parking spaces are located, or in both the vehicle and the facility.

The device may include a communication device configured to receive a respective surrounding image from the facility.

The processor may be configured to control the vehicle according to the final parking path to park the vehicle in the target parking space.

In another general aspect, here is provided a processor implemented method including determining one or more candidate parking spaces in an area around a vehicle and determining a final parking path from a current location to a target parking space by using a user selected initial parking path of a plurality of parking paths to the target parking space as an initial search value for the final parking path.

The method may include receiving a first user input indicating a selection of an initial parking path from the current location to the target parking space from among the one or more candidate parking spaces and receiving a second user input indicating a movement of the vehicle from the current location to the target parking space as the initial parking path.

The method may include receiving a selection of a target parking space from among the one or more candidate parking spaces based on a user input, displaying the current location of the vehicle and the target parking space on a display within the vehicle, and receiving a user touch input connecting the current location and the target parking space via the display to set the initial parking path.

The method may include receiving a user speech command and determining one or a combination of two or more of a time to start controlling the vehicle according to the final parking path, a moving speed of the vehicle, and a parking type of the vehicle, based on the speech command.

The parking type of the vehicle is a selection of a direction in which the vehicle is to face when parked in the target parking space.

The determining of the final parking path may include generating a probability distribution based on the initial parking path within a search area and generating the final parking path using the probability distribution as a sample for extending a tree from a starting point corresponding to the current location to an ending point corresponding to the target parking space in the search area.

The determining of the final parking path may include dividing a search area into a plurality of grids, deactivating one or more grids of the plurality of grid that are located a distance greater than or equal to a predetermined distance from the initial parking path within search area, and determining an optimal path among remaining grids of the plurality of grids connecting the current location to the target parking space as the final parking path.

The determining the final parking path may include applying a search algorithm employing the initial search value as a starting point.

The determining of the final parking path may include inactivating a portion of a search area to which a search algorithm is applied to reduce the search area and determining the final parking path in the reduced search area using the initial parking path.

Other features and aspects will be apparent from the following detailed description, the drawings, and the claims.

BRIEF DESCRIPTION OF THE DRAWINGS

FIG. 2 illustrates an example of a process of determining a final parking path and controlling a vehicle according to one or more embodiments.

Figure 1:
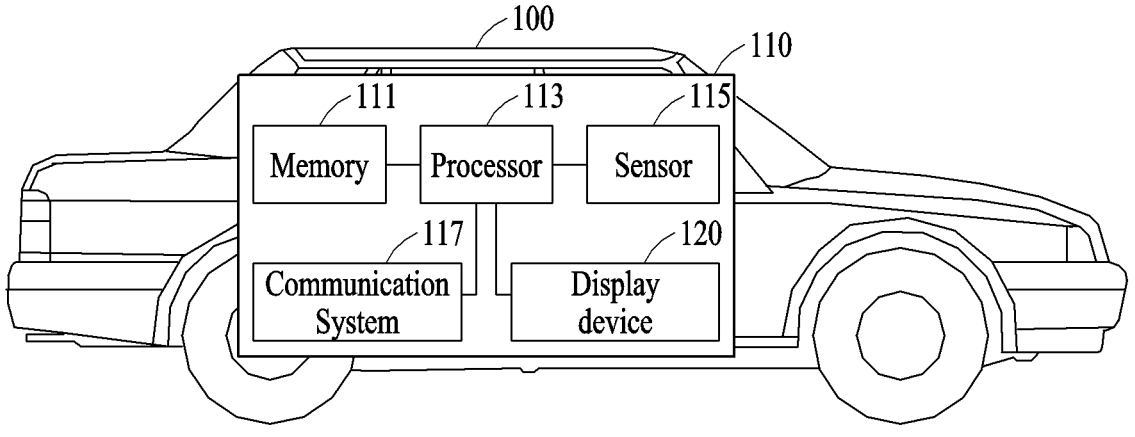
FIG. 1 illustrates an example of an electronic device according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Although the typical SPAS systems may determine a parking path from a current location of the vehicle to the parking space, typical SPAS systems may not be capable of considering many or all of the possible paths from the current location of the vehicle to the parking space. One or more embodiments may determine a parking path with many or all such possible paths.

FIG. 1 illustrates an example of an electronic device according to one or more embodiments.

Referring to FIG. 1, various examples of vehicle 100 embodiments exist, including all types of mechanized transportation, such as traveling on a road, track, or other surfaces. The vehicle 100 may be, for example, an automobile, a motorcycle, a bicycle, and the like, and the automobile may be any one of various types, such as a passenger car, a freight vehicle, and a two-wheeled vehicle. The vehicle 100 may be an autonomous vehicle, an intelligent vehicle, and a vehicle equipped with a driving assistance system. The vehicle 100 described herein may be a vehicle in which an electronic device 110 is provided, but is not limited thereto. In one or more examples, the electronic device 110 may be such a driving system. The vehicle 100 may also be referred to as the electronic device 110, and thus, the electronic device 110 may include various additional components of the vehicle 100.

The electronic device 110 may include a memory 111, a processor 113, a sensor 115, communication device 117, and a display device 120, or example.

The memory 111 may include computer-readable instructions. The processor 113 may be configured to execute computer-readable instructions, such as those stored in the memory 111, and through execution of the computer-readable instructions, the processor 113 is configured to perform one or more, or any combination, of the operations and/or methods described herein. The memory 111 may be a volatile or nonvolatile memory.

The processor 113 may further execute programs, and/or may control the electronic device 110 and operations of the vehicle 100, and may include any one or a combination of two or more of, for example, a central processing unit (CPU), a graphic processing unit (GPU), a neural processing unit (NPU) and tensor processing units (TPUs), but is not limited to the above-described examples. The processor 113 may also be representative of one or more electronic control units (ECUs)

The processor 113 may recognize a parking space around the vehicle using information detected (captured) by the sensor 115 disposed in the vehicle 100, and determine a parking path from a current location of the vehicle 100 to the recognized parking space. The vehicle 100 may be parked by autonomously controlling the movement of the vehicle 100 along the parking path without the user of the vehicle 100 being in control of the vehicle 100 (e.g., a passenger of the vehicle 100 or an operator of the electronic device 110). The processor 113, or another processor of the vehicle 100, may control the autonomous process. In an example, the processor 113 may quickly and effectively determine an optimal parking path from the current location of the vehicle 100 to the parking space by utilizing an initial parking path input from the user when determining the parking path.

The sensor 115 may include one or more sensors disposed in/on the vehicle 100. For example, the sensor 115 may include a plurality of cameras that capture the surroundings (e.g., the front, rear, left side, right side, and the like) of the vehicle 100, but the number or arrangement of the cameras is not limited to that of the above-described example. In an example, a camera may capture images (image information), such as color, grayscale, depth, etc., where a captured image includes pixel values. In addition, the sensor 115 may include one or more ultrasonic sensors that measure a distance from the vehicle 100 to surrounding objects, but the number or arrangement of the ultrasonic sensors is not limited to that of the above-described example. In addition, various types of sensors, such as LIDAR, may be disposed in the vehicle 100 without limitation. Respective information detected by the sensor 115 may be transmitted to the processor 113.

Although the sensor 115 is illustrated as being included in the electronic device 110 in the example of FIG. 1, examples are not limited thereto. For example, the electronic device 110 may process an image received from an external sensor. That is even in examples with external sensors or sensors being separate from the electronic device 110 or the vehicle 100, the description of the present disclosure is applied in various examples. In addition, although the electronic device 110 is illustrated as being provided in the vehicle 100 in the example of FIG. 1, examples are not limited thereto. For example, the information detected by the sensor 115 provided in the vehicle 100 may be transmitted to the external electronic device 110 and then processed. In this example, the external electronic device 110 may be, for example, various computing devices, such as a mobile phone, a smartphone, a tablet, an e-book device, a laptop, a personal computer (PC), a desktop, a workstation, or a server, various wearable devices, such as a smart watch, smart eyeglasses, a head-mounted display (HMD), or smart clothes, various home appliances such as a smart speaker, a smart television (TV), or a smart refrigerator, and other devices, such as a smart vehicle, a smart kiosk, an Internet of things (IoT) device, a walking assist device (WAD), a drone, a robot, and the like.

The display device 120 may be implemented using a liquid crystal display (LCD), a light-emitting diode (LED) display, a plasma display panel (PDP), a screen, a terminal, or any other type of display configured to display the images and information to be displayed by the image display apparatus. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

FIG. 2 illustrates an example of a process of determining a final parking path and controlling a vehicle according to one or more embodiments.

In general, a user may not know the exact distance from a current location of a vehicle to a target parking space or how far the vehicle is from surrounding obstacles, but the user may recognize an approximate parking path for the vehicle to reach the target parking space. On the other hand, an electronic device may not know or recognize the approximate parking path without searching for a predetermined parking path based on a search algorithm, but the electronic device, e.g., the electronic device 110 of FIG. 1, may use one or more sensors provided in the vehicle to accurately determine the distance from the current location of the vehicle to the target parking space or a distance between the vehicle and surrounding obstacles. Based on the characteristics of the user and the electronic device, when the user inputs an approximate initial parking path from the current location of the vehicle to the target parking space in the electronic device, the electronic device may use the initial parking path input by the user as initial information for the search algorithm for the parking path and may utilize distance information acquired through the sensor, to quickly and effectively search for the final parking path. Hereinafter, operations of the electronic device are described in detail with reference to the drawings.

Operations illustrated in FIG. 2 may be performed sequentially, but not necessarily sequentially. For example, the order of the operations may be changed and at least two of the operations may be performed in parallel. Operations 210 to 250 may be performed by at least one processor of the electronic device 110 of FIG. 1, for example.

In operation 210, the electronic device may provide the user with one or more candidate parking spaces available for parking in an image of an area surrounding the vehicle. The electronic device may generate an image of the surrounding area using images acquired through one or more cameras disposed in the vehicle or one or more cameras disposed in a facility where the one or more candidate parking spaces are located. For example, the electronic device may access or receive image information from such facility cameras using the communication system 117 of FIG. 1, e.g., transceiver circuitry. The facility may provide these images to the vehicle through an Internet connection, a network connection, or another communication method. In addition, the electronic device may determine one or more candidate parking spaces in which the vehicle may be parked in the surrounding image. In addition, the electronic device may display the one or more candidate parking spaces on the image of the surrounding area. As a non limiting example, operation 210 will be described in further detail with reference to FIGS. 3A and 3B.

In operation 220, the electronic device may receive a selection of a target parking space and an initial parking path from the user. For example, the electronic device may receive the user's selection of a target parking space, which may be selected from one of the one or more candidate parking spaces displayed in the surrounding image. Also, the electronic device may receive the user's selection of an initial parking path from a current location of the vehicle to the target parking space. As another example, without a separate user selection for a target parking space, the electronic device may receive an initial user selection of a parking path leading from the current location of the vehicle to one of the one or more candidate parking spaces. In this example, the electronic device may recognize a parking space corresponding to a point where the initial parking path ends as the target parking space. Operation 220 will be described in detail below with reference to FIGS. 4A to 4C.

In operation 230, the electronic device may search for a parking path by using the initial parking path as initial information for a search algorithm for the parking path. In some examples, the initial parking may be the initial search information in the search for the final parking path. The electronic device may reduce an area to be searched by inactivating a portion or removing a portion of the surround area to be searched from being considered by the search algorithm. This search algorithm is thus focused on the reduced search area to determine the final parking path using the initial parking path. Also, the electronic device may search for the final parking path in the reduced search area. Operation 230 will be described in detail with reference to FIGS. 5 and 6.

In operation 240, the electronic device may determine whether the final parking path has been found by the search algorithm. The electronic device may determine whether the final parking path has been found according to whether the search for the final parking path is completed within a predetermined time in the reduced search area. For example, when the search is not completed within a predetermined time, it may be determined that the search for the final parking path has failed, and operation 220 may be subsequently performed. Although not illustrated in FIG. 2, according to examples, when the search for the final parking path fails, the electronic device may provide a message about the search failure to the user and terminate the operation. On the other hand, when the search is completed within a predetermined time, it is determined that the search for the final parking path has succeeded, and operation 250 may be subsequently performed.

Limiting the search for a parking path such that it only occurs at a predetermined time may increase the likelihood that the user will re-enter the initial parking path rather than continue to search for a different parking path based on the initial parking path when the initial parking path the user inputs is incorrect, but examples are not limited thereto. The predetermined time may be determined by one or a combination of two or more of search algorithm performance, user tendency, parking lot type, and parking situation, but is not limited to the above-described example.

As a non-limiting example, operation 240 will be described in further detail with reference to FIGS. 5 and 6. In operation 250, the electronic device may park the vehicle in a target parking space by controlling the vehicle according to the final parking path. For example, the electronic device may control steering and acceleration/deceleration using a vehicle controller (e.g., a longitudinal controller, a lateral controller, an integrated longitudinal and lateral controller, and the like) according to the final parking path. The controller may have a structure in which longitudinal and lateral directions are decoupled, or may have structure that is an integrated form. For example, the controller may be a Pure-pursuit controller, a Kanayama controller, a Stanley controller, a Sliding Window controller, a Model Predictive controller, and the like. The controller may generate control signal that when provided to a steering rack, for example, and a throttle, move and park the vehicle.

Figure 3A:
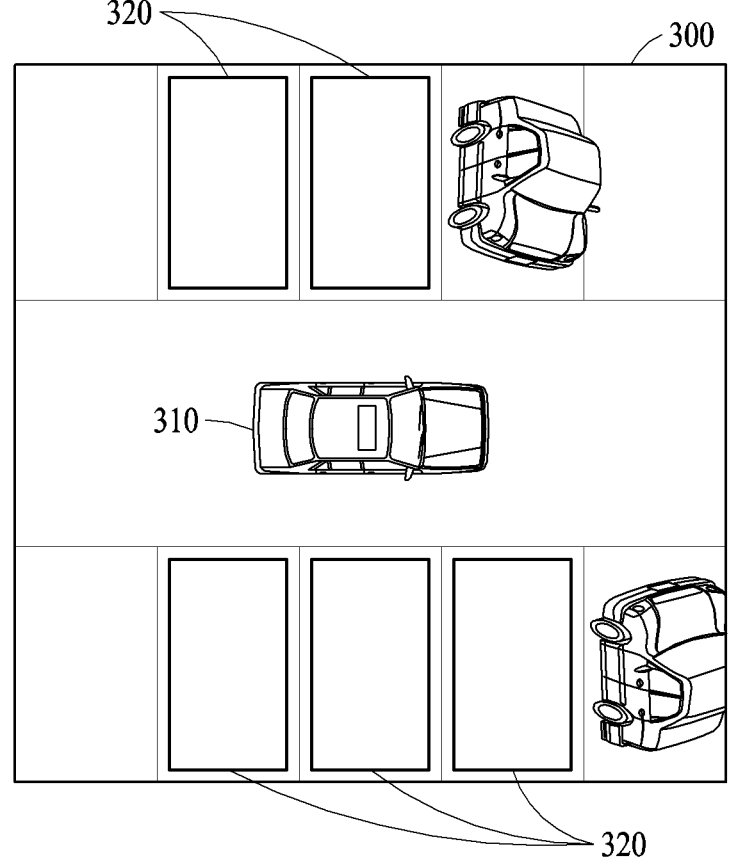
FIGS. 3A and 3B illustrate examples of a process of displaying one or more candidate parking spaces in an image of surroundings of a vehicle according to one or more embodiments.
Figure 3B:
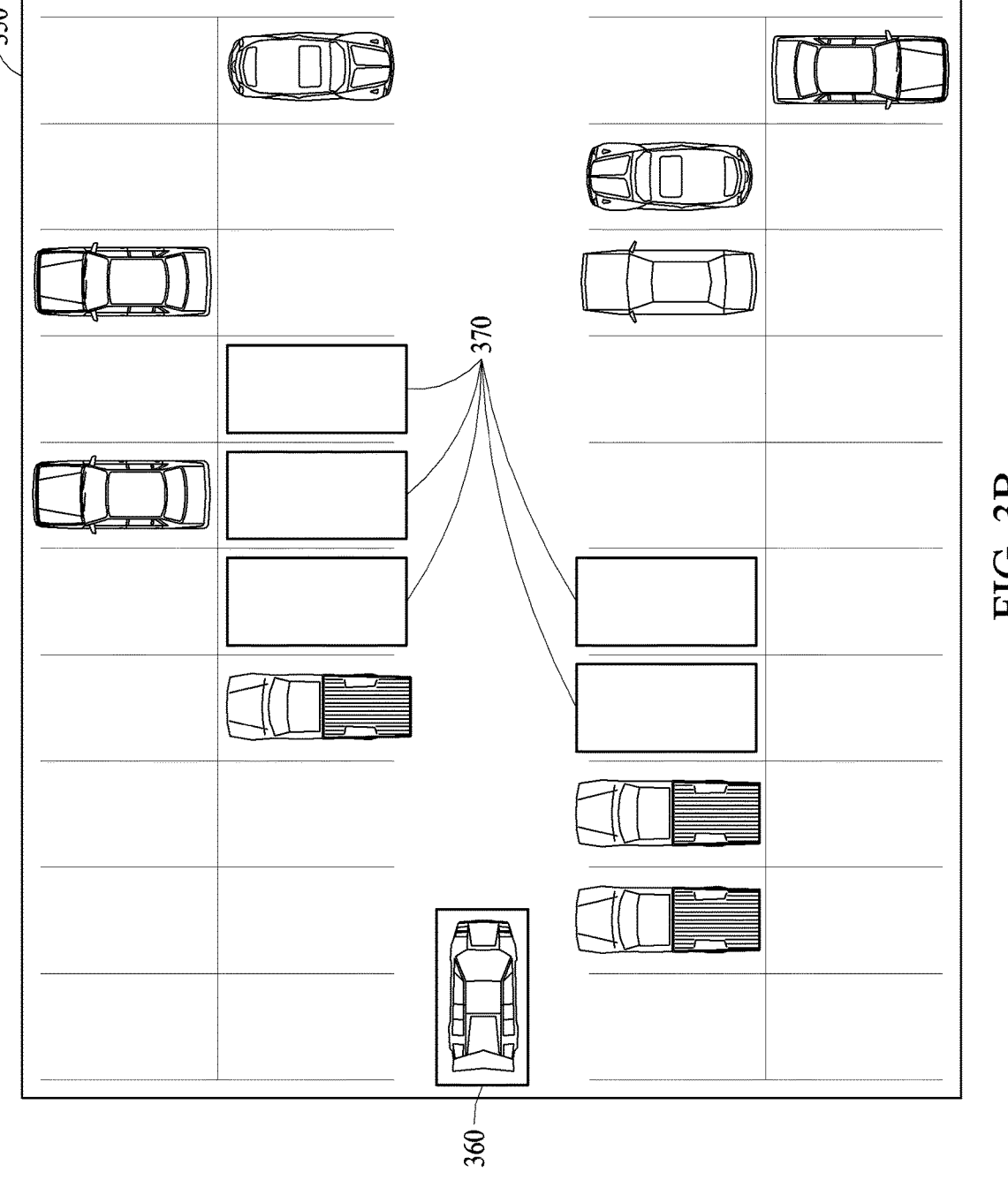

FIGS. 3A and 3B illustrate examples of a process of displaying one or more candidate parking spaces in an image of an area surrounding a vehicle according to one or more embodiments.

Referring to FIG. 3A, an image 300 of the area surrounding a vehicle 310 is illustrated as an example. The surrounding image 300 may be a top-view image generated by combining images (e.g., a front image, a rear image, a left side image, a right side image, and the like) acquired through one or more cameras disposed in the vehicle 310 that may make up the sensor 115 of FIG. 1, for example. One or more candidate parking spaces 320 in which the vehicle 310 may park may be displayed on the surrounding image 300. For example, a candidate parking space may represent a space in which parking is allowed because a parking line is drawn, and no other vehicle is located within the parking line. When the surrounding image 300 is input, the candidate parking spaces 320 may be recognized in the surrounding image 300 by using an object or space recognition machine learning model, e.g., a corresponding neural network, that is trained to output the candidate parking spaces 320 in which the vehicle 310 may park, but the examples are not limited thereto. Each of the candidate parking spaces 320 may be displayed on the surrounding image 300 as a rectangle based on four points (i.e., four vertices). The surrounding image 300 may be provided to the user by being displayed on a display connected to the electronic device, but is not limited to the above-described example. For example, the surrounding image 300 may be displayed in a display device receiving the surrounding image 300 from the electronic device through a wired network and/or a wireless network.

Referring to FIG. 3B, another example of an image 350 of an area surrounding a vehicle 360 is illustrated. The surrounding image 350 may be generated by combining images acquired through one or more cameras disposed in a parking lot in a management system of a parking lot where the vehicle 360 is located or a server for assisting a parking operation of the vehicle 360. The surrounding image 350 may be an image generated based on images captured by cameras disposed in a parking lot, and may not be limited by a location of the vehicle 360 compared to the surrounding image 300 illustrated in FIG. 3A and may include a wider parking space. However, the example is not limited thereto. One or more candidate parking spaces 370 in which the vehicle 360 may park may also be displayed on the surrounding image 350. Since the surrounding image 350 is not limited by the location of the vehicle 360, a parking space somewhat distant from the location of the vehicle 360 may be displayed as a candidate parking space. The descriptions referring to FIG. 3A may apply to the operation of recognizing a candidate parking space. Thus, a detailed description thereof will be omitted.

For ease of description, FIGS. 3A and 3B illustrate an example in which five candidate parking spaces 320 located in front of the vehicle 310 are displayed on the surrounding image 300, but various other examples may be applied without limitation. For example, a predetermined number of candidate parking spaces located in one or a combination of two or more of a front, rear, right side, and left side of the vehicle may be determined and displayed on the surrounding image 300 according to a preset preference value.

Figure 4A:
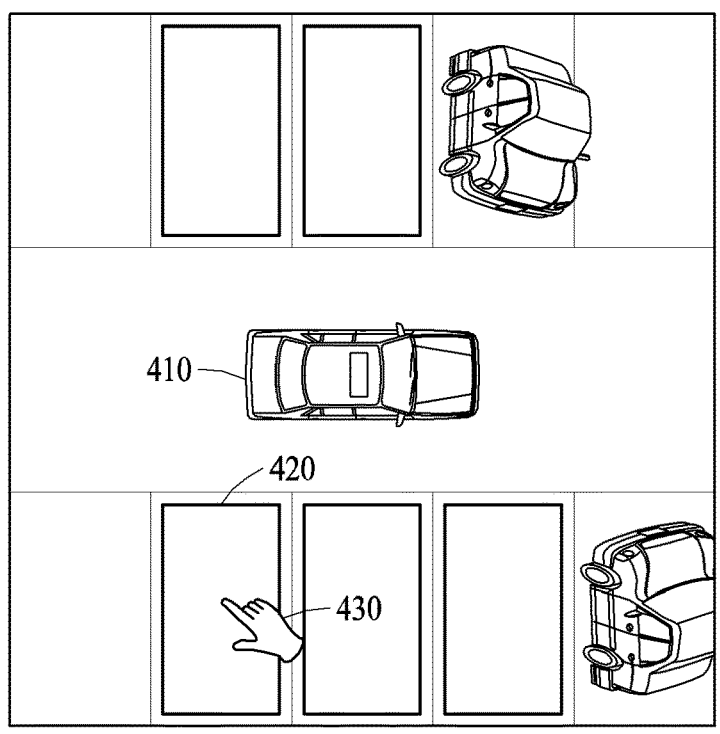
FIGS. 4A to 4C illustrate examples of a process of receiving an initial parking path input from a user according to one or more embodiments.
Figure 4B:
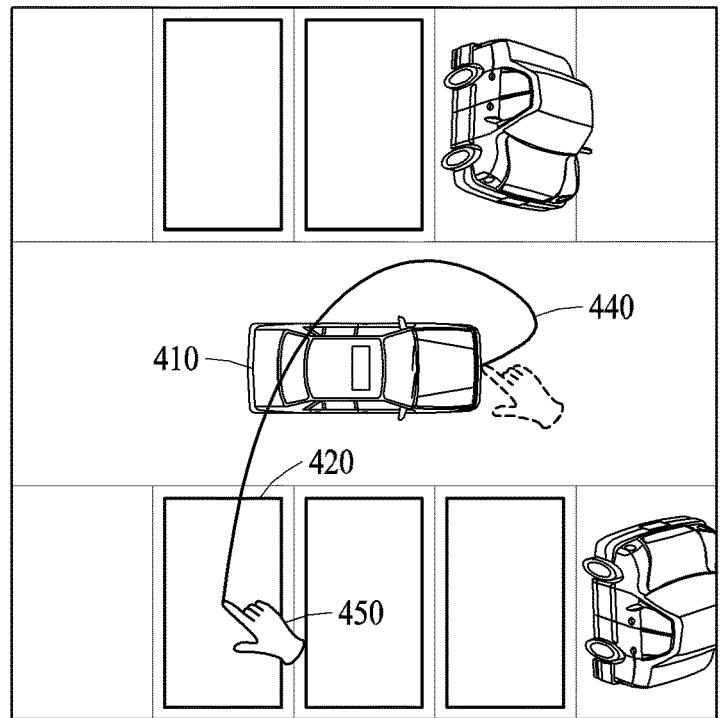
Figure 4C:
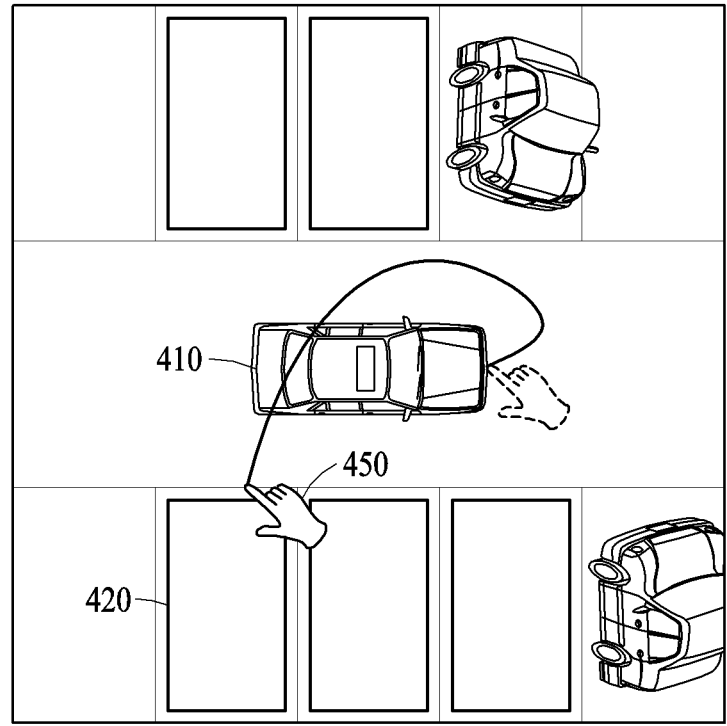

FIGS. 4A to 4C illustrate examples of a process of receiving an initial parking path input from a user according to one or more embodiments.

Referring to FIG. 4A, an electronic device may receive a selection of a target parking space 420 from among the one or more candidate parking spaces, from a user. For example, the user input may be input as a touch input 430, or via a touch control, when the user touches one of the one or more candidate parking spaces displayed in a surrounding image, the electronic device may recognize the candidate parking space touched by the user as the target parking space 420. That is, the display may be capable of receiving a touch input 430 and providing that input to the processor 113. In another example, the electronic device may recognize a voice selection of the target parking space 420 spoken by the user. For example, when the user speaks a command that identifies a desired parking space, such as "the first parking space on the right", the electronic device may recognize the target parking space 420 based on a location of the vehicle by recognizing the user's command from the user's speech. In addition, the electronic device may receive a selection of the target parking space 420 from the user through various other methods.

Depending on an example, the target parking space 420 may be visually displayed differently in the surrounding image from other parking spaces, or candidate parking spaces that were not selected as the target parking space 420 may be removed from the surrounding image.

Referring to FIG. 4B, the electronic device may receive an initial parking path 440 from a current location of the vehicle 410 to the target parking space 420, from the user. For example, a midpoint (i.e., a starting point) of a front bumper of the vehicle 410 and a midpoint (i.e., an ending point) of the target parking space 420 may be displayed in the surrounding image, and the user may use a touch input 450 on a device displaying the surrounding image to draw a path starting, for example, at an initial parking path 440 and connecting the starting point to the ending point. In this example, the surrounding image may be displayed on a touch display, and the touch input 450 of the user may be input to the touch display.

In another example illustrated in FIG. 4C, without selecting a target parking space among one or more candidate parking spaces, when the user inputs the touch input 450 connected to one of the one or more candidate parking spaces, from a current location of the vehicle 410, the electronic device may recognize the candidate parking space corresponding to a point at which the corresponding touch input 450 ends as the target parking space 420.

In addition, the user may guide an autonomous parking operation to be performed through the touch inputs 430 and 450 as well as through voice commands. For example, when the user utters "forward parking," "reverse parking," or "parallel parking," as a non-limiting example, the electronic device may recognize the user's speech, and, corresponding recognized speech, and determine a direction in which the vehicle 410 is disposed in the target parking space 420. For example, the processor of the electronic device 110, or other processor of the vehicle 100, may be configured to perform natural language processing (NLP). A parking type of the vehicle 410 may be determined by the user's speech or voice command, and the determined parking type may be used to reduce a search area to which a search algorithm is applied so that a final parking path suited to the user's intention may be efficiently determined.

In addition, when the user utters "start parking after that vehicle passes" or "start parking after that person passes," the electronic device may recognize the user's speech and start controlling the vehicle according to the final parking path, such as according to command features extracted from the speech in the NLP so that, depending on the example, the electronic device starts the parking operation after that vehicle and/or person in the area surrounding the vehicle has passed by.

In addition, when the user utters "park slowly" or "park quickly," the electronic device may recognize the user's speech and control a moving speed of the vehicle 410 moving along the final parking path.

Voice commands are not limited to the above-described examples, and any speech may be included without limitation in an example in which a parking path and/or movement of the vehicle 410 is controlled through a vocal, or voice, command.

Figure 5:
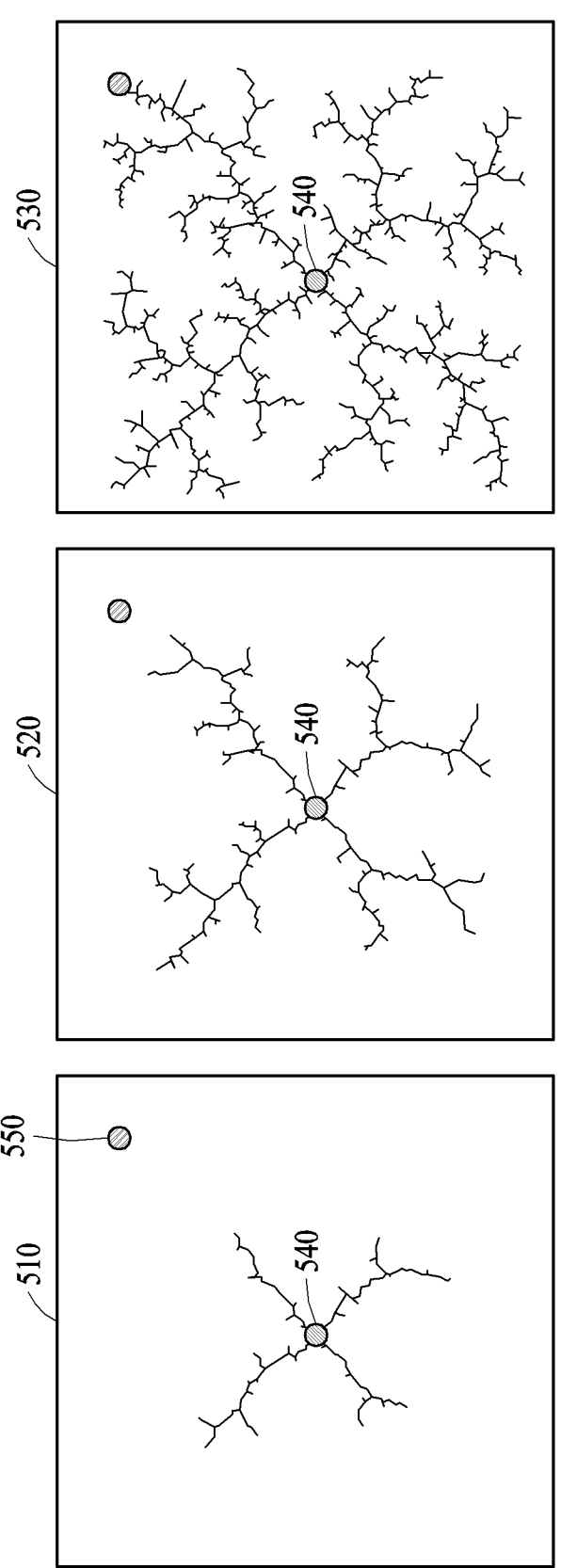
FIGS. 5 and 6 illustrate examples of a process of determining a final parking path by using an initial parking path as initial information for a search algorithm for a parking path according to one or more embodiments.
Figure 6:

FIGS. 5 and 6 illustrate examples of a process of determining a final parking path by using an initial parking path as initial information for a search algorithm for a parking path according to one or more embodiments.

The electronic device may effectively reduce the amount of computation and time required for a search by inactivating a portion of the area to be searched for which the search algorithm is applied to determine a final parking path using an initial parking path input from a user, thereby reducing the size of the search by searching for the final parking path in the reduced search area.

Referring to FIG. 5, an example of an operation of determining a final parking path by using an initial parking path as initial information for a sampling-based approach algorithm (e.g., rapidly-exploring random tree (RRT), and the like) is illustrated. Operations 510 to 530 may represent a chronological order of a process of a tree being extended from a starting point 540 corresponding to a current location of a vehicle in the search area according to the sampling-based approach algorithm to an ending point 550 corresponding to a target parking space. In an example, in operation 510, the search of the search area for a parking path between the starting point 540 to the ending point 550 has begun. In operation 520, the search area has expanded from the starting point 540 in all directions but has not yet reached the ending point 550. In operation 530, the search of the search area has expanded to the point where one of the trees has reached the ending point 550. However, as is evident in each of operations 510, 520, and 530, the search trees expanded in each direction while most of these searches are unlikely to arrive at the ending point 550 from the starting point 540.

A point in the search area may represent a predetermined state including a location, posture, speed, and the like of the vehicle, the starting point 540 may represent a state of the vehicle located at the current location, and the ending point 550 may represent a state of the vehicle located at the target parking space.

The electronic device may generate a probability distribution based on the initial parking path within the search area, and use the probability distribution as a sample for extending the tree from the starting point 540 to the ending point 550 in the search area to determine the final parking path. For example, when the tree extended from the starting point 540 in the search area reaches the ending point 550 within a predetermined time, the electronic device may determine the final parking path based on the tree connecting the starting point 540 to the ending point 550.

Referring to FIG. 6, an example of an operation of determining a final parking path by using the initial parking path as initial information for a grid-based approach algorithm (e.g., Hybrid A*, D*, and the like) is illustrated.

A search area 600 may be a space in which a state including a location, posture, and speed of a vehicle is standardized in a grid. In the search area 600, a starting point 610 may represent a state of the vehicle located at a current location, and an ending point 620 may represent a state of the vehicle located at a target parking space. In addition, in the search area 600, a white grid may represent a state in which the vehicle can move, a black grid may represent a state in which the vehicle cannot move, and a dotted grid may represent a final parking path connecting the starting point 610 to the ending point 620.

The electronic device may reduce the size of the search area by inactivating grids separated by a distance from the initial parking path greater than or equal to a predetermined distance within the search area 600. Thus a reduced search area can be considered and then an optimal path 630 connecting the starting point 610 to the ending point 620 may be found among the activated grids. The optimal path may be designated as the final parking path.

Figure 7:
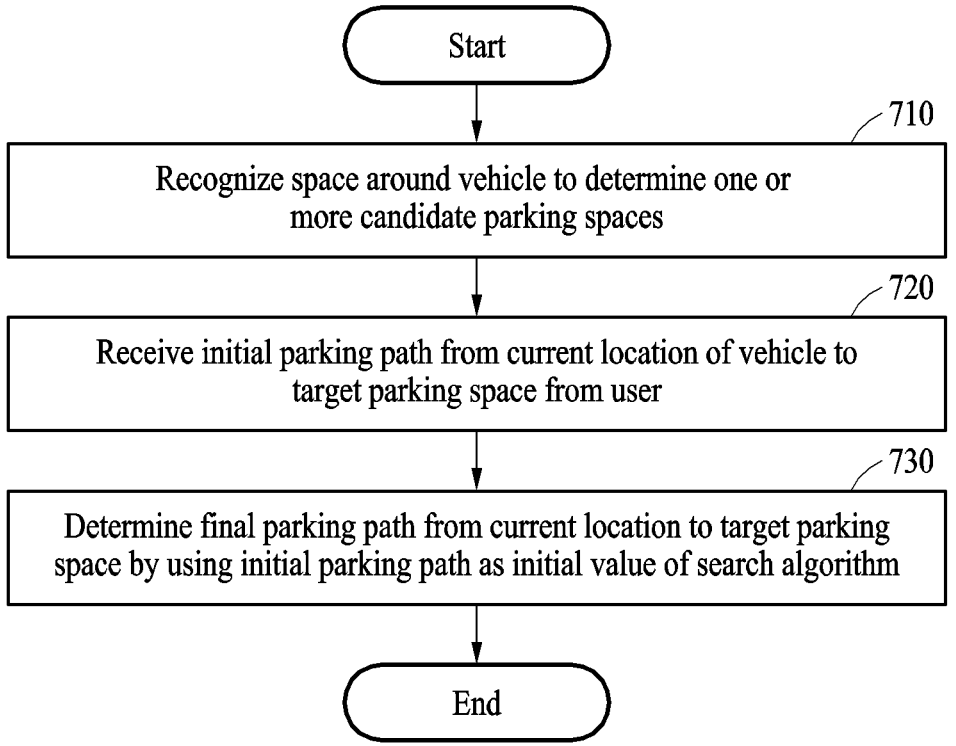
FIG. 7 illustrates an example of an operating method of an electronic device according to one or more embodiments.

However, the search algorithm is not limited to the above-described sampling-based approach algorithm or grid-based approach algorithm, and an optimization-based approach algorithm (e.g., model predictive control (MPC)) may also be applied without limitation. FIG. 7 illustrates an example of an operating method of an electronic device.

In the following example, operations may be performed sequentially, but not necessarily sequentially. For example, the order of the operations may be changed and at least two of the operations may be performed in parallel. Operations 710 to 730 may be performed by at least one component (e.g., a processor) of the electronic device.

In operation 710, the electronic device recognizes a space around a vehicle to determine one or more candidate parking spaces. The electronic device may generate an image of the area surrounding the vehicle using images acquired through one or more cameras disposed in the vehicle. In addition, the vehicle may be in communication with a network or a facility where the one or more candidate parking spaces are located. Based on this communication with the facility, the electronic device may receive images of the facility that would include areas surrounding the vehicle for the determination of one or more paths and/or available parking spaces within that facility. The images from one or both of the facility and the vehicle's cameras may be used to form the surrounding image. The electronic device may determine one or more candidate parking spaces in which the vehicle may be parked, in the surrounding image, and display the one or more candidate parking spaces in the surrounding image.

In operation 720, the electronic device may receive a user input that provides an initial parking path from a current location of the vehicle to a target parking space among the one or more candidate parking spaces. The electronic device may receive the user input via a user's touch input indicating movement of the vehicle from the current location to the target parking space as an initial parking path. The electronic device may receive a selection of a target parking space, from among the one or more candidate parking spaces, from the user input, display the current location of the vehicle and the target parking space on a display connected to the electronic device, and receive a touch input connecting the current location and the target parking space on the display from the user and set the input as an initial parking path.

In operation 730, the electronic device determines a final parking path from the current location to the target parking space by using the initial parking path as initial information for a search algorithm for a search for the parking path. In order to determine the final parking path using the initial parking path, the electronic device may reduce a search area by inactivating a portion of the search area to which the search algorithm is applied and determine the final parking path in the reduced search area. The electronic device may generate a probability distribution based on the initial parking path within the search area, and use the probability distribution as a sample for extending a tree from a starting point corresponding to a current location to an ending point corresponding to a target parking space in the search area to determine the final parking path. The electronic device may divide the search area into one or more grids. Among the grids, the electronic device may deactivate one or more of the grids in an example where some grides are separated by a distance greater than or equal to a predetermined distance from the initial parking path. The remaining grids may be activated grids being within the search area that indicate areas to which the vehicle can move. That is, the activated grids may be with the predetermined distance to the vehicle. Among the activated grids, a variety of paths can be considered as potential paths. The algorithm would consider a path based on a starting point corresponding to the current location and an ending point corresponding to the target parking space. Among the various paths that would be generated and considered by the algorithm, an optimal path that is found among the potential paths may be designated as the final parking path.

The electronic device may receive the initial parking path from the user again in response to a search for the final parking path not being completed within a predetermined time.

In addition, the electronic device may detect speech from the user, and based on the speech, determine one or a combination of two or more of a time to start controlling the vehicle according to the final parking path, a moving speed of the vehicle, and a parking type of the vehicle. The parking type of the vehicle may be related to a desired direction of the vehicle parked when parked in the target parking space.

In addition, the electronic device may park the vehicle in a target parking space by controlling the vehicle according to the final parking path.

Through this process, it may be possible to address varying search performance due to variances in an initial search direction or a reduced initial search area, since it is impossible for the electronic device to search for all parking paths from the current location of the vehicle to the target parking space. The electronic device may effectively reduce the amount of computation or time required to search for a parking path by using the initial parking path input from the user as initial information for the search algorithm. In addition, the electronic device may determine a parking path in which the user's preferred method is reflected by utilizing the initial parking path input from the user, and the user may also be able to roughly predict the parking path.

The memory 111, processor 113, sensor 115, communication system 117, display device 120, and vehicle 100, described herein or disclosed herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A device, comprising:

a processor configured to execute a plurality of instructions; and a memory storing the plurality of instructions, wherein execution of the plurality of instructions configures the processor to be configured to:

recognize a space around a vehicle to determine one or more candidate parking spaces;

determine a final parking path from a current location to a target parking space by using a user generated initial parking path as an initial value for a search algorithm for the final parking path; and control the vehicle according to the final parking path to park the vehicle in the target parking space, wherein the determining comprises:

dividing a search area corresponding to the space around the vehicle into a plurality of grids;

deactivating one or more grids of the plurality of grids that are separated from the user generated initial parking path by a distance greater than or equal to a predetermined distance to provide a reduced search area; and executing, by the processor, a search algorithm to determine the final parking path connecting the current location and the target parking space within the reduced search area based on the user generated initial parking path.

2. The device of claim 1, wherein the processor is configured to:

receive a first user input indicating the user generated initial parking path from a current location of the vehicle to the target parking space from among the one or more candidate parking spaces; and receive a second user input to indicate a movement of the vehicle from the current location to the target parking space for the user generated initial parking path.

3. The device of claim 1, wherein the processor is configured to:

display the current location of the vehicle on a display; and receive a user input, the user input comprising:

reception of a first user touch input through a touch control indicating a selection of the target parking space from among the one or more candidate parking spaces;

display the target parking space on the display; and reception of a second user touch input through the touch control connecting the current location and the target parking space on the display to set the user generated initial parking path.

4. The device of claim 3, further comprising the displays, wherein the touch control is received through the display.

5. The device of claim 1, wherein the processor is configured to:

determine one or a combination of two or more of a time to start controlling the vehicle according to the final parking path, a moving speed of the vehicle, and a parking type of the vehicle, based on a voice command.

6. The device of claim 5, wherein the parking type of the vehicle is a selection of a direction in which the vehicle is to face when parked in the target parking space.

7. The device of claim 1, wherein the processor is configured to:

generate a probability distribution based on the user generated initial parking path within a search area; and extend a tree from a starting point corresponding to the current location to an ending point corresponding to the target parking space in the search area to generate the final parking path using the probability distribution as a sample.

8. The device of claim 1, wherein the processor is configured to:

request a second initial parking in response to a search for the final parking path not being completed within a predetermined time.

9. The device of claim 1, wherein the processor is configured to:

generate a surrounding image of the vehicle using images acquired through one or more cameras;

determine one or more candidate parking spaces in which the vehicle may be parked, in the surrounding image; and display the one or more candidate parking spaces in the surrounding image.

10. The device of claim 9, wherein the one or more cameras are disposed in the vehicle, in a facility where the one or more candidate parking spaces are located, or in both the vehicle and the facility.

11. The device of claim 10, further comprising a communication device configured to receive a respective surrounding image information from the facility.

12. A processor implemented method, the method comprising:

determining one or more candidate parking spaces in an area around a vehicle;

determining a final parking path from a current location to a target parking space by using a user generated initial parking path as an initial search value for a search algorithm for the final parking path; and controlling the vehicle according to the final parking path to park the vehicle in the target parking space, wherein the determining comprises:

dividing a search area corresponding to the space around the vehicle into a plurality of grids;

deactivating one or more grids of the plurality of grids that are separated from the user generated initial parking path by a distance greater than or equal to a predetermined distance to provide a reduced search area; and executing, by the processor, a search algorithm to determine the final parking path connecting the current location and the target parking space within the reduced search area based on the user generated initial parking path.

13. The method of claim 12, further comprising:

receiving a first user input indicating a selection of the user generated initial parking path from the current location to the target parking space from among the one or more candidate parking spaces; and receiving a second user input indicating a movement of the vehicle from the current location to the target parking space as the user generated initial parking path.

14. The method of claim 12, further comprising:

receiving a selection of a target parking space from among the one or more candidate parking spaces based on a user input;

displaying the current location of the vehicle and the target parking space on a display within the vehicle; and receiving a user touch input connecting the current location and the target parking space via the display to set the user generated initial parking path.

15. The method of claim 12, further comprising:

receiving a speech command; and determining one or a combination of two or more of a time to start controlling the vehicle according to the final parking path, a moving speed of the vehicle, and a parking type of the vehicle, based on the speech command.

16. The method of claim 12, wherein the determining the final parking path comprises applying a search algorithm employing the initial search value as a starting point.

* * * * *